(12) United States Patent
Mezzalira

(10) Patent No.: US 8,057,877 B2
(45) Date of Patent: Nov. 15, 2011

(54) FLEXIBLE HOSE WITH NON-PHTHALATE PLASTICIZERS ADDITIVES FOR TRANSPORTING FOOD LIQUIDS

(76) Inventor: Rinaldo Mezzalira, Arcignano di Sandrigo (IT); Alessandro Mezzalira, legal representative, Sandrigo (IT)

( * ) Notice: Subject to any disclaimer, the term of this patent is extended or adjusted under 35 U.S.C. 154(b) by 431 days.

(21) Appl. No.: 12/304,764

(22) PCT Filed: Jun. 13, 2007

(86) PCT No.: PCT/IB2007/052231
§ 371 (c)(1),
(2), (4) Date: Dec. 13, 2008

(87) PCT Pub. No.: WO2007/144831
PCT Pub. Date: Dec. 21, 2007

(65) Prior Publication Data
US 2009/0169784 A1 Jul. 2, 2009

(30) Foreign Application Priority Data
Jun. 13, 2006 (IT) ................. VI2006A0180

(51) Int. Cl.
B29D 22/00 (2006.01)
B29D 23/00 (2006.01)
B32B 1/08 (2006.01)

(52) U.S. Cl. ............. 428/36.91; 428/36.9; 428/35.7; 428/36.6; 138/118; 138/137; 138/140; 138/141; 138/153

(58) Field of Classification Search .......... 428/35.7, 428/36.9, 36.91, 36.6; 138/118, 137, 140, 138/141, 153
See application file for complete search history.

(56) References Cited

U.S. PATENT DOCUMENTS

| 5,477,888 A | 12/1995 | Mezzalira |
| 6,397,894 B2 | 6/2002 | Leray et al. |
| 2007/0123622 A1 | 5/2007 | Schaefer |

FOREIGN PATENT DOCUMENTS

| DE | 19727142 A1 | 10/1998 |
| DE | 20311708 | 10/2003 |
| DE | 20312108 | 11/2003 |
| EP | 1563985 A2 | 8/2005 |
| EP | 1351002 B1 | 10/2006 |
| JP | 08289928 | 11/1996 |
| JP | 2003070902 | 3/2003 |
| WO | 02092686 A1 | 11/2002 |
| WO | 03029339 A1 | 4/2003 |

OTHER PUBLICATIONS

BASF Hexamoll(R) DINCH Data Sheet, Feb. 2005.

(Continued)

*Primary Examiner* — Michael C Miggins
(74) *Attorney, Agent, or Firm* — Themis Law

(57) ABSTRACT

A flexible hose for transporting food liquids, particularly for irrigation or the like, comprising at least one outer protective layer (2) of a first flexible polymer material and at least one inner layer (3) in direct contact with the fluid to be transported, made of a second flexible polyvinyl chloride (PVC)-containing polymer material. The second polymer material includes a plasticizer agent having as low a migration level as to maintain the flexibility of said second polymer material substantially unaltered with time. The plasticizer agent is selected from the group comprising non-phthalate additives, so that it can be non-toxic and non-polluting for the food products to be transported.

22 Claims, 2 Drawing Sheets

OTHER PUBLICATIONS

Anonymous, A Plasticizer for Sensitive Applications: With Hexamoll(R) DINCH, BASF Offers an Innovative Solution for Soft PVC Toys and Medical Devices, SpecialChem, Oct. 26, 2005.

Directive 2005/84/EC of the European Parliament and of the Council, Official Journal of the European Union, Dec. 14, 2005.

F. Welle, G. Wolz, R. Franz, Migration of plasticizers from PVC tubes into enteral feeding solutions, Pharma International, Mar. 2005.

Unknown, pp. 430-38 and 760-765 of German Book, Publication date unknown, 2007.

C. Wilkes, C. Daniels, J. Summers, PVC Handbook, Carl Hanser Verlag, Munich 2005, Section 5.4, Table 5.5, p. 350.

MEISTER-GRUPPE, Letter to DIY World, Aug. 29, 2005.

_US 8,057,877 B2_

FLEXIBLE HOSE WITH NON-PHTHALATE PLASTICIZERS ADDITIVES FOR TRANSPORTING FOOD LIQUIDS

FIELD OF THE INVENTION

This invention finds application in the art of flexible hoses, and particularly relates to a flexible hose for transporting food liquids.

BACKGROUND OF THE INVENTION

PVC hoses are known to be made from a polymer added with plasticizer additives, which are designed to improve processability and flexibility of the final product.

Phthalates are generally used as plasticizers, because they impart excellent cold flexibility to the final product and have low migration characteristics. As a result of migration, the hose stiffens, loses its original flexibility and can crack or even collapse.

When food liquids are to be transported, phthalates may be extracted by the transported fluid. Phthalates are known to be potentially toxic, and ingestion thereof must be absolutely prevented.

Therefore, the need has long been felt of a hose having a PVC layer in direct contact with the fluid to be transported, which also includes at least one plasticizer agent having relatively low migration, to maintain flexibility of the hose substantially unaltered with time, and which will not pollute the transported fluid or add toxicity thereto.

SUMMARY OF THE INVENTION

The object of this invention is to overcome the above drawbacks, by providing a food liquid-transporting hose that is highly efficient and relatively cost-effective.

A particular object is to provide a hose having a PVC layer in direct contact with a food fluid, that can maintain its mechanical flexibility properties unaltered with time and does not contain additives which might add toxicity to and/or pollute the transported fluid.

These and other objects, as better explained hereafter, are fulfilled by a flexible hose for transporting food liquids as defined in claim 1, comprising at least one outer protective layer of a first flexible polymer material, at least one inner layer in direct contact with the fluid to be transported, of a second flexible polymer material, wherein at least the second flexible polymer material contains polyvinyl chloride (PVC).

According to the invention, at least the second polymer material includes a plasticizer agent having as low a migration level as to maintain the flexibility of said second polymer material substantially unaltered with time. Furthermore, the plasticizer agent is selected from the group comprising non-phthalate additives, so that it can be non-toxic and non-polluting for the food products to be transported.

Thanks to this particular configuration, the hose of the invention fulfils the above long-felt need, which has not been met by prior art hoses yet. The use of a non-phthalate agent having a low migration rate allows to keep the flexibility of the layer, and the hose as a whole, unaltered with time.

The term "food liquids" as used herein is meant to indicate liquids susceptible of being directly or indirectly ingested by animals or men.

The term "inner layer in direct contact with the fluid to be transported" is meant to indicate that the fluid to be transported is at least partly in contact with such inner layer with no other interface layer being interposed therebetween.

The term "plasticizer agent" as used herein is meant to designate a component having a plasticizing action or a mixture of components having a plasticizing action.

The term "mixture" as used herein is meant to indicate a combination of two or more components, possibly having a common base.

Conveniently, the plasticizer agent may have a migration level of 0 to 2, preferably of about 1.

The term "migration level" as used herein is meant to designate the degree of plasticizer spew in a PVC-containing polymer material, as measured according to ASTM D 3291. In such known test (commonly known as "loop test") a specimen of material is bent into a loop and held in such position at ambient temperature. The spew level is measured at predetermined intervals by having the inner surface of the loop specimen contact an absorbent paper sheet. The wetting degree of the sheet will determine the plasticizer exudation degree based on the following scale of values:

0: no spew (or "no migration");
1: low spew (or "low migration");
2: moderate spew (or "moderate migration");
3: high spew (or "high migration").

Advantageously, the plasticizer agent may be selected from the group comprising compounds or compound mixtures having such a structure and may be provided in such a weight percentage based on the second polymer material as to impart a cold flexibility of less than −5° C. to such second polymer material.

The term "structure" as used herein is meant to designate the chemical and/or physical configuration of the compound or compound mixture, which determines its chemical and/or physical properties.

Unless otherwise stated, the term "percentage by weight with respect to a PVC-containing material" is meant to designate the dry weight percentage of a component of interest based on the dry weight of PVC.

The term "cold flexibility" as used herein is meant to designate the temperature of deflection ($T_f$) of a polymer material under a torsional stress at low temperature, as measured according to ASTM D 1043 (commonly known as "Clash-Berg test"). A predetermined torque is applied to a polymer material specimen of a predetermined size, within a predetermined range of temperatures, to reach a given bending angle. The temperature at which the specimen will have such bending angle will be the desired $T_f$.

Conveniently, cold flexibility may be of −5° C. to −40° C. and may be preferably of about −21° C.

Advantageously, the plasticizer agent content may be from 20% to 100% by weight based on the content of the second polymer material.

BRIEF DESCRIPTION OF DRAWINGS

Further features and advantages of the invention will be more apparent upon reading the detailed description of a preferred, non-exclusive embodiment of a hose according to the invention, which is described as a non-limiting example with the help of the annexed drawings, in which.

DETAILED DESCRIPTION OF A PREFERRED EMBODIMENT

Referring to the above figures, the flexible hose of the invention, generally designated by numeral 1, may be advantageously used for transporting food liquids, such as portable water. In a preferred, non exclusive embodiment, the hose of the invention is advantageously used for transporting portable irrigation water in outdoor environments, such as a garden, a meadow, or the like.

The hose 1 essentially comprises an outer protective layer 2 of a first flexible polymer material and an inner layer 3 in direct contact with the fluid to be transported, made of a second flexible polyvinyl chloride (PVC)-containing polymer material.

The second polymer material includes a plasticizer agent having as low a migration level as to maintain the flexibility of the layer and the hose as a whole substantially unaltered with time. The plasticizer agent is further selected from the group comprising non-phthalate additives, so that it can be non-toxic and non-polluting for the food products to be transported.

Particularly, the plasticizer agent may be selected from the group comprising adipates, benzoates, 1,2-propanediol and/or 1,3- and/or 1,4-butanediol and/or polypropylene glycol polyesters with adipic acid, acetic acid or C10-C18 fatty acids or n-octanol and/or n-decanol, trimellitates, phosphates, sebacates, alkyl sulphonates, epoxidized linseed and soybean oils, DINCH® and/or citrates, either alone or in combinations of two or more thereof. It shall be understood that the plasticized agent may be a mixture of multiple compounds having a common base, such as a mixture of multiple monomeric or polymeric adipate compounds, or a mixture of monomer benzoate compounds, without departure from the scope of the invention, as defined by the annexed claims.

Figure 3:
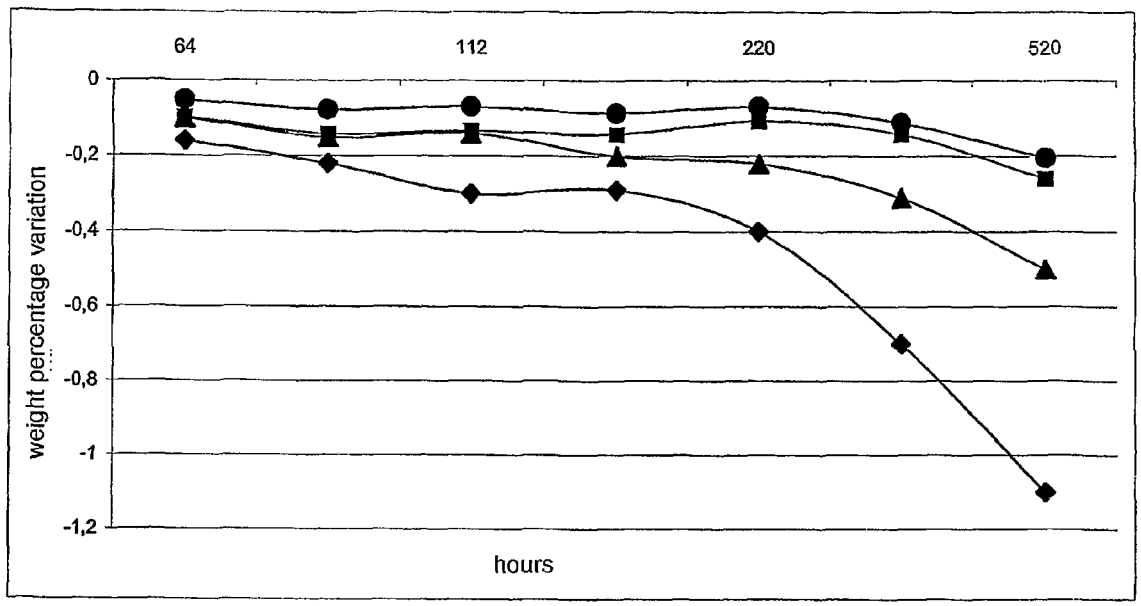
FIG. 3 is a diagram of volatility in air at 50° C. of certain PVC-containing materials and certain plasticizer agents that may be used in PVC compounds.
Figure 4:
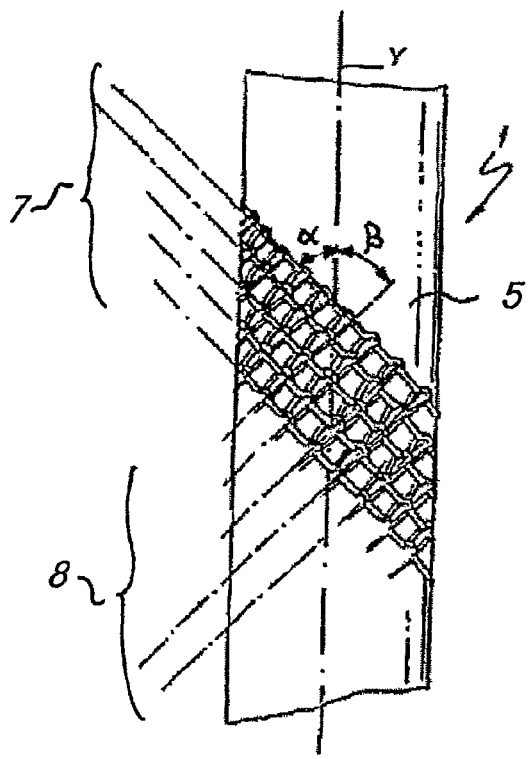
FIG. 4 is a view of a particular embodiment of the hose according to the invention with the outer layer omitted.

FIG. 3 shows a diagram of the volatility in air at 50° C. of certain PVC-containing materials and certain plasticizer agents against time, which is measured as a weight percentage variation of the specimen at predetermined time intervals, from time 0 to 520 hours.

Particularly, the symbol (●) designates the curve of volatility against time of a first non-phthalate plasticizer agent, available under the trade name DINCH®. The diagram shows that, in these conditions, this first non-phthalate plasticizer agent has a low migration rate (1), corresponding to about −0.20% volatility by weight.

The symbol (¦) designates the volatility against time of a second non-phthalate monomeric or polymeric adipate-based plasticizer agent. The diagram shows that, in these conditions, this second non-phthalate plasticizer agent has a low migration rate (1), corresponding to about −0.26% volatility by weight with respect to the initial weight, at time 0.

The symbol (?) designates the volatility against time of a third non-phthalate citrate-based plasticizer agent. The diagram shows that, in these conditions, this third non-phthalate plasticizer agent has a moderate migration rate (2), corresponding to about −0.55% volatility by weight with respect to the initial weight, at time 0.

The symbol (♦) designates the volatility against time of a fourth non-phthalate monomeric adipate-based plasticizer agent. The diagram shows that, in these conditions, this fourth non-phthalate plasticizer agent has a high migration rate (3), corresponding to about −1.1% volatility by weight after 520 hours.

Without being bound to any theory, it is established that a non-phthalate plasticized agent having a high migration level (3), corresponding to less than −1.0% by weight of volatility in air at 50° C. with respect to the initial weight.

Preferably, the plasticizer agent may have a migration level of 0 to 2, preferably of about 1.

Conveniently, the plasticizer agent may be so selected as to cause the second polymer material to have a cold flexibility of less than −5° C. Particularly, such selection relates to the structure of such compounds and their weight percentage based on the second polymer material.

Suitably, the plasticizer agent content may be from 20% to 100% by weight based on the content of the second polymer material.

According to a preferred, non exclusive embodiment of the invention, the plasticizer agent may be a monomeric and polymeric adipate mixture.

A few samples of second polymer materials comprising such a plasticizer agent will be described hereinbelow for illustration purposes only. These samples were measured for bending temperature ($T_f$) under ASTM D 1043 ("Clash-Berg test") and migration level under ASTM D 3291 ("Loop test") after 168 hours. The weight percentages indicated in the table below are weight percentages based on the total weight of the plasticizer agent. The weight percentage content of the plasticizer agent based on the content of the second polymer material is identical in all specimens. The composition of the second polymer material, excepting the plasticizer agent, is identical in all specimens. The torsional modulus used in the Clash-Berg test is 135000 psi.

|  | % mon. adip. | % polym. adip. | $T_f$(° C.) | Loop Test (168 h) |
|---|---|---|---|---|
| Samp 1 | 100 | 0 | −52 | 3 |
| Samp 2 | 0 | 100 | −2 | 0 |
| Samp 3 | 90 | 10 | −47 | 3 |
| Samp 4 | 80 | 20 | −38 | 2 |
| Samp 5 | 50 | 50 | −27 | 2 |
| Samp 6 | 30 | 70 | −21 | 1 |
| Samp 7 | 20 | 80 | −16 | 1 |
| Samp 8 | 10 | 90 | −10 | 0 |

"Samp 1" designates a first sample of a second polymer material comprising an adipate plasticizer agent. Particularly, this first plasticizer agent is 100% monomeric adipate. The results show that, while this sample exhibits an excellent cold flexibility (−52° C.), it has an unacceptably high migration level (3).

Without being bound to any theory, it can be established that a non-phthalate plasticizer agent having a high migration level (3) does not fall within the scope of this invention.

"Samp 2" designates a second sample of a second polymer material comprising an adipate plasticizer agent. Particularly, this second plasticizer agent is 100% polymeric adipate. The results show that, while this sample exhibits zero migration (0), it has an unacceptably low cold flexibility (−2° C.).

Without being bound to any theory, it can be established that a non-phthalate type plasticizer agent having a cold flexibility $T_f$ of −5° C. does not fall within the scope of this invention.

"Samp 3" designates a third sample of a second polymer material comprising an adipate plasticizer agent. Particularly, this third plasticizer agent is made up of 10% polymeric adipate and 90% monomeric adipate. The results show that, while this sample exhibits a very good cold flexibility (−47° C.), it has an unacceptably high migration level (3).

"Samp 4" designates a fourth sample of a second polymer material comprising an adipate type plasticizer agent. Particularly, this fourth plasticizer agent is made up of 20% polymeric adipate and 80% monomeric adipate. The results show that, while this sample exhibits a very good cold flexibility (−38° C.), it has a moderate migration level (2).

"Samp 5" designates a fifth sample of a second polymer material comprising an adipate plasticizer agent. Particularly, this fifth plasticizer agent is made up of 50% polymeric adipate and 50% monomeric adipate. The results show that, while this sample exhibits a good cold flexibility (−27° C.), it has a moderate migration level (2).

"Samp 6" designates a sixth sample of a second polymer material comprising an adipate plasticizer agent. Particularly, this sixth plasticizer agent is made up of 70% polymeric adipate and 30% monomeric adipate. The results show that, while this sample exhibits a good cold flexibility (−21° C.), it has a low migration level (1).

"Samp 7" designates a seventh sample of a second polymer material comprising an adipate plasticizer agent. Particularly, this seventh plasticizer agent is made up of 80% polymeric adipate and 20% monomeric adipate. The results show that, while this sample exhibits a good cold flexibility (−16° C.), it has a low migration level (1).

"Samp 8" designates an eighth sample of a second polymer material comprising an adipate plasticizer agent. Particularly, this eighth plasticizer agent is made up of 90% polymeric adipate and 10% monomeric adipate. The results show that, while this sample exhibits a hardly acceptable cold flexibility (−10° C.), it has a zero migration level (0).

Conveniently, the monomeric type adipate content in the mixture may be in a range from 10% to 50% by weight and preferably of about 30%, whereas the polymeric type adipate content in the mixture may be in arrange from 90% to 50% by weight, and preferably of about 70% by weight.

Advantageously, the cold flexibility of the second polymer material may be of −10° C. to −40° C. and is preferably of about −21° C.

According to a further preferred, non exclusive embodiment of the invention, the second polymer material has a Shore A hardness of 50 to 95, preferably of about 75.

The second polymer material may further comprise a stabilizer agent, having a weight percentage content from 0.5% to 3% by weight based on the content of the second polymer material.

Advantageously, the stabilizer agent may include a heavy metal- and Zn-free composition for the hose to be environmentally-friendly. Heavy metals constitute a potential pollution hazard for the transported fluid and zinc, typically contained in various known stabilizer systems, can cause early degradation of the PVC product, and in certain cases prevent recycling thereof.

Preferably, this composition will include a porous mineral solid material, selected from zeolites and hydrotalcites and a salt of a fatty acid or perchloric acid of alkali metals or alkaline-earth metals selected from Li, Na, K, Mg, Ca. This formulation, which may include suitable antioxidants and/or co-stabilizers will impart high temperature stability to the PVC wherefrom the layer 3 is made, and allow recycling thereof with the methods known to those skilled on the art.

In a preferred, non exclusive embodiment, the stabilizer agent may include a composition prepared in accordance with the teachings of International Application WO 02/092686.

Figure 1:
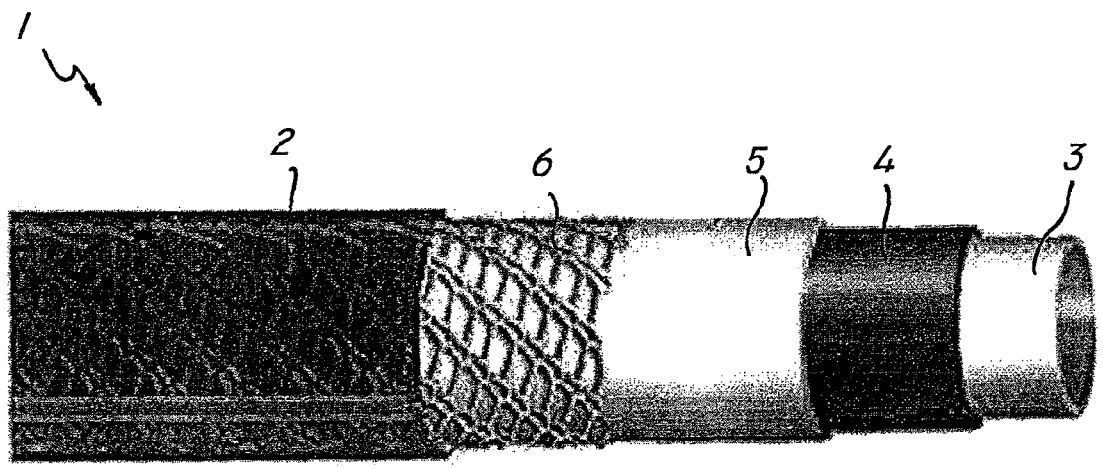
FIG. 1 is a perspective view of one embodiment of the hose according to the invention.
Figure 2:
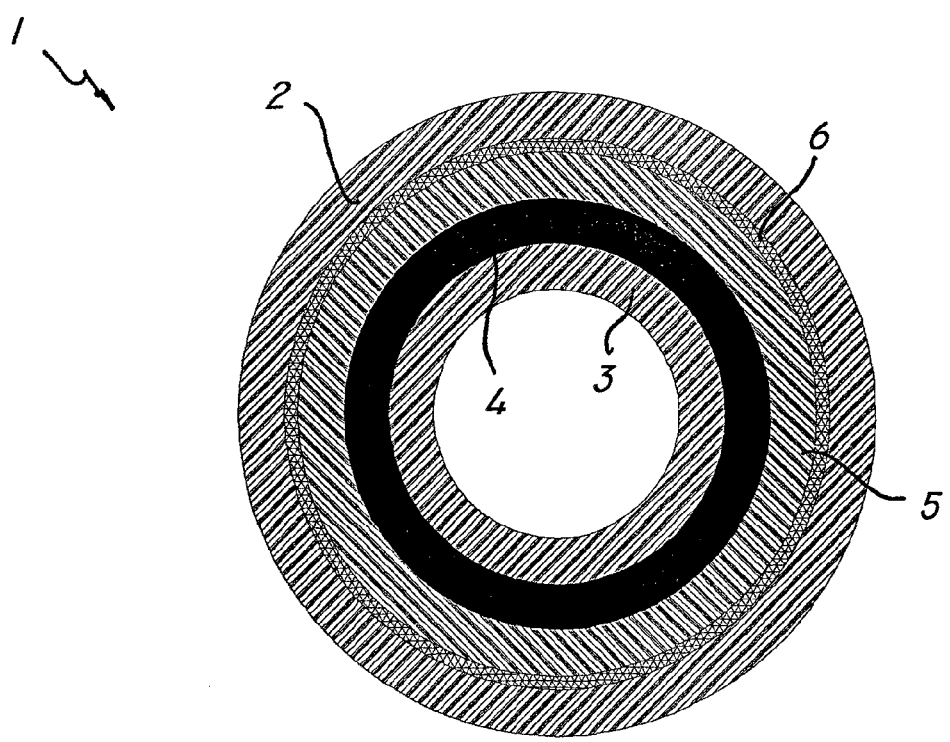
FIG. 2 is a sectional view of the hose of FIG. 1, as taken along a plane II-II.

Furthermore, in a preferred non exclusive embodiment of the invention, the hose 1 may have additional intermediate layers, designated in FIGS. 1 and 2 by numerals 4, 5 and 6. Nevertheless, it shall be understood that any other layer may be interposed between the outer layer 2 and the inner layer 3 without departure from the scope of the invention, as defined by the annexed claims.

An intermediate layer 4 may be formed from a third polymer material, which may also have a PVC matrix and include a dark coloring agent, preferably of the carbon black type, for preventing algal bloom within the hose, in a weight percentage of 0.1% to 10% based on the weight of the third polymer material. The layer 4 may further comprise appropriate plasticizer agents and/or stabilizer agents, such as the plasticizer agent and the stabilizer agent as described above.

The layer 5 may be similar to the inner layer 3, therefore it may also have a PVC matrix with the plasticizer agent and the stabilizer agent as described above.

The fibrous reinforcement layer 6 may have a spiral wrapped or mesh form with simple or double chain stitches, and be formed in accordance with the teachings of patents EP-B1-0623776 or EP-B1-0960297, by the Applicant hereof.

Particularly, the chain-mesh fibrous layer 6 may have substantially parallel rows of stitches 7 and substantially parallel lines of stitches 8.

Advantageously, the lines 8 and the rows 7 of stitches may be mutually inclined with respect to the longitudinal axis Y of the hose, at respective predetermined angles α, β.

In operation, the hose may be formed using well-known techniques, such as coextrusion.

The above description clearly shows that the hose of the invention fulfils its intended objects, and particularly meets the requirement of providing a hose having a PVC layer in direct contact with a food fluid, that can maintain its mechanical flexibility properties unaltered with time and does not contain additives which might add toxicity to and/or pollute the transported fluid.

The use of a second polymer material including a non-phthalate plasticizer agent having as low a migration level as to maintain the flexibility of the layer and the hose as a whole substantially unaltered with time allows to meet the above mentioned long-felt need that is yet unmet by prior art hoses.

The hose of this invention is susceptible of a number of changes and variants, within the inventive concept disclosed in the appended claims. All the details thereof may be replaced by other technically equivalent parts, and the materials may vary depending on different needs, without departure from the scope of the invention.

While the hose has been described with particular reference to the accompanying figures, the numerals referred to in the disclosure and claims are only used for the sake of a better intelligibility of the invention and shall not be intended to limit the claimed scope in any manner.

The invention claimed is:

1. A flexible hose for transporting food liquids, comprising at least one outer protective layer (2) of a first flexible polymer material, at least one inner layer (3) in direct contact with the fluid to be transported, made of a second polymer material, wherein said at least second flexible polymer material comprises polyvinyl chloride,
   characterized in that at least said second polymer material includes a plasticizer agent having as low a migration level as to maintain the flexibility of said second polymer material substantially unaltered with time, said plasticizer agent being selected from the group consisting of non-phthalate additives, so that it can be non-toxic and non-polluting for the food products to be transported.

2. Hose according to claim 1, characterized in that said plasticizer agent has a migration level of 0 to 2, preferably of about 1.

3. Hose according to claim 1, characterized in that said plasticizer agent is selected from the group comprising compounds having such a structure and is provided in such a weight percentage based on said second polymer material as to impart a cold flexibility of less than −5° C. to said second polymer material.

4. Hose according to claim 1, characterized in that said plasticizer agent is selected from the group comprising adipates, benzoates, 1,2-propanediol and/or 1,3- and/or 1,4-butanediol and/or polypropylene glycol polyesters with adipic acid, acetic acid or C10-C18 fatty acids or n-octanol and/or n-decanol, trimellitates, phosphates, sebacates, alkyl sulphonates, epoxidized linseed and soybean oils, DINCH® and/or citrates, either alone or in combinations of two or more thereof.

5. Hose according to claim 1, characterized in that said second polymer material has a Shore A hardness of 50 to 95, and preferably of about 75.

6. Hose according to claim 3, characterized in that said cold flexibility is of −5° C. to −40° C. and is preferably of about −21° C.

7. Hose according to claim 3, characterized in that the plasticizer agent content is from 20% to 100% by weight based on the content of said second polymer material.

8. Hose according to claim 1, characterized in that said plasticizer agent is a mixture of monomeric and polymeric adipates.

9. Hose according to claim 8, characterized in that the monomeric adipate content in said plasticizer agent is in a range from 10% to 50% by weight and preferably of about 30% by weight.

10. Hose according to claim 8, characterized in that the polymeric adipate content in said plasticizer agent is in a range from 90% to 50% by weight and preferably of about 70% by weight.

11. Hose according to claim 1, characterized in that said second polymer material further comprises a stabilizer agent.

12. Hose according to claim 11, characterized in that the stabilizer agent content is from 0.5% to 3% by weight based on the content of said second polymer material.

13. Hose according to claim 11, characterized in that said stabilizer agent includes a heavy metal- and Zn-free composition.

14. Hose according to claim 13, characterized in that said composition includes a porous mineral solid material, selected from zeolites or hydrotalcites and a salt of a fatty acid or perchloric acid of alkali metals or alkaline-earth metals selected from Li, Na, K, Mg, Ca.

15. Hose according to claim 1, characterized in that it further has an intermediate layer (4) of a third flexible polymer material interposed between said outer protective layer (2) and said inner layer (3).

16. Hose according to claim 15, characterized in that said third polymer material comprises a dar coloring agent for preventing algal bloom within the hose.

17. Hose according to claim 16, characterized in that said coloring agent is of the carbon black type.

18. Hose according to claim 17, characterized in that the carbon black coloring agent content is from 0.1% to 10% by weight based on the content of said third polymer material.

19. Hose according to claim 1, characterized in that it has a fibrous reinforcement layer (6) interposed between said outer layer (2) and said inner layer (3).

20. Hose according to claim 19, characterized in that said fibrous reinforcement layer (6) has a spiral wrapped or mesh form with simple or double chain stitches.

21. Hose according to claim 20, characterized in that said chain-mesh fibrous layer (6) has substantially parallel rows of stitches (7) and/or substantially parallel lines of stitches (8).

22. Hose according to claim 21, characterized in that said lines of stitches (8) and said rows of stitches (7) are mutually inclined with respect to the longitudinal axis (Y) of the hose, at respective predetermined angles ($\alpha$, $\beta$).

* * * * *